Oct. 23, 1934.  B. SASSEN ET AL  1,978,389
AUTOMATIC PATTERN CONTROLLED MILLING MACHINE
Filed Sept. 20, 1932  8 Sheets-Sheet 8
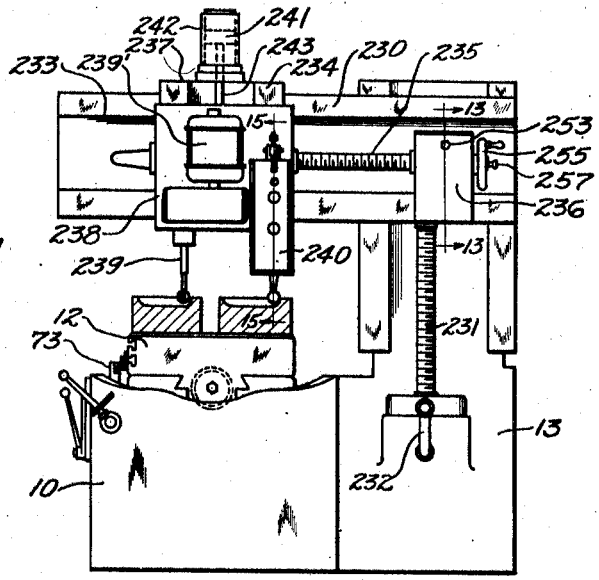
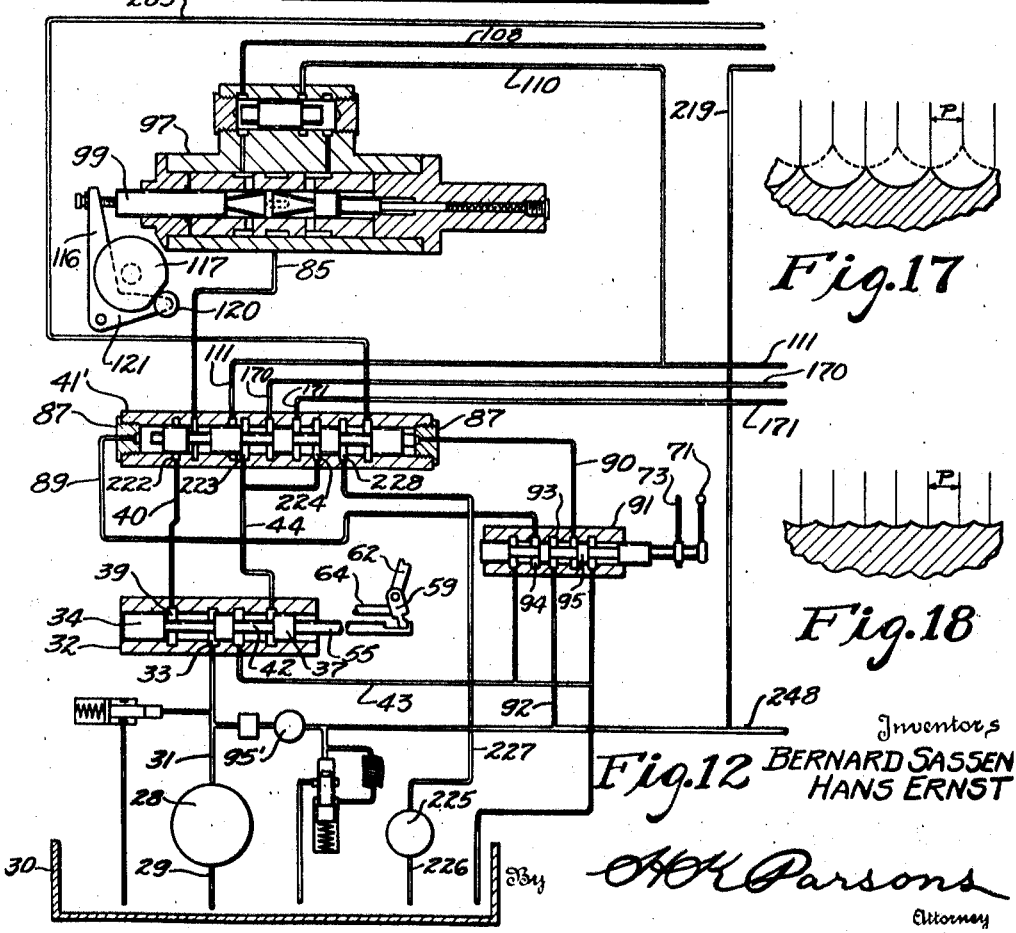
Inventors
BERNARD SASSEN
HANS ERNST
By AH Parsons
Attorney Patented Oct. 23, 1934

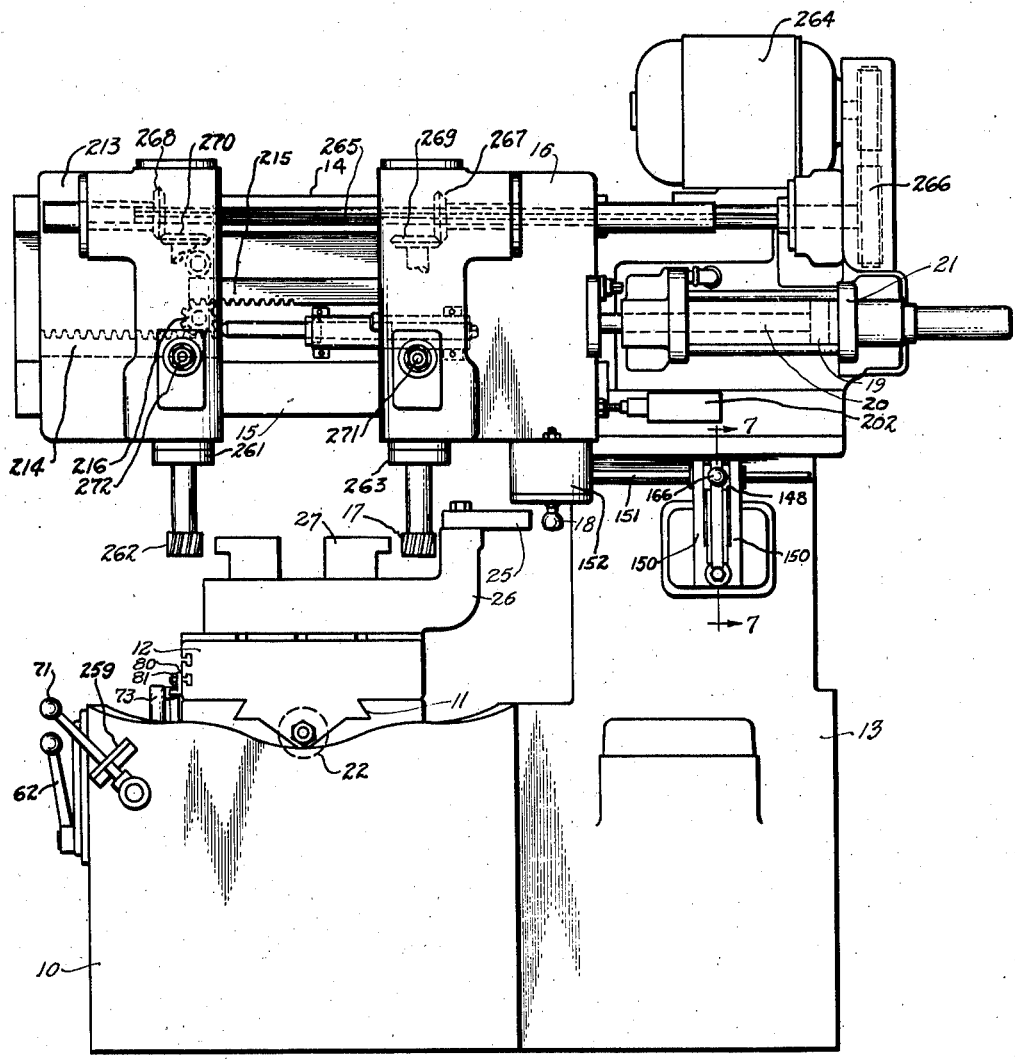

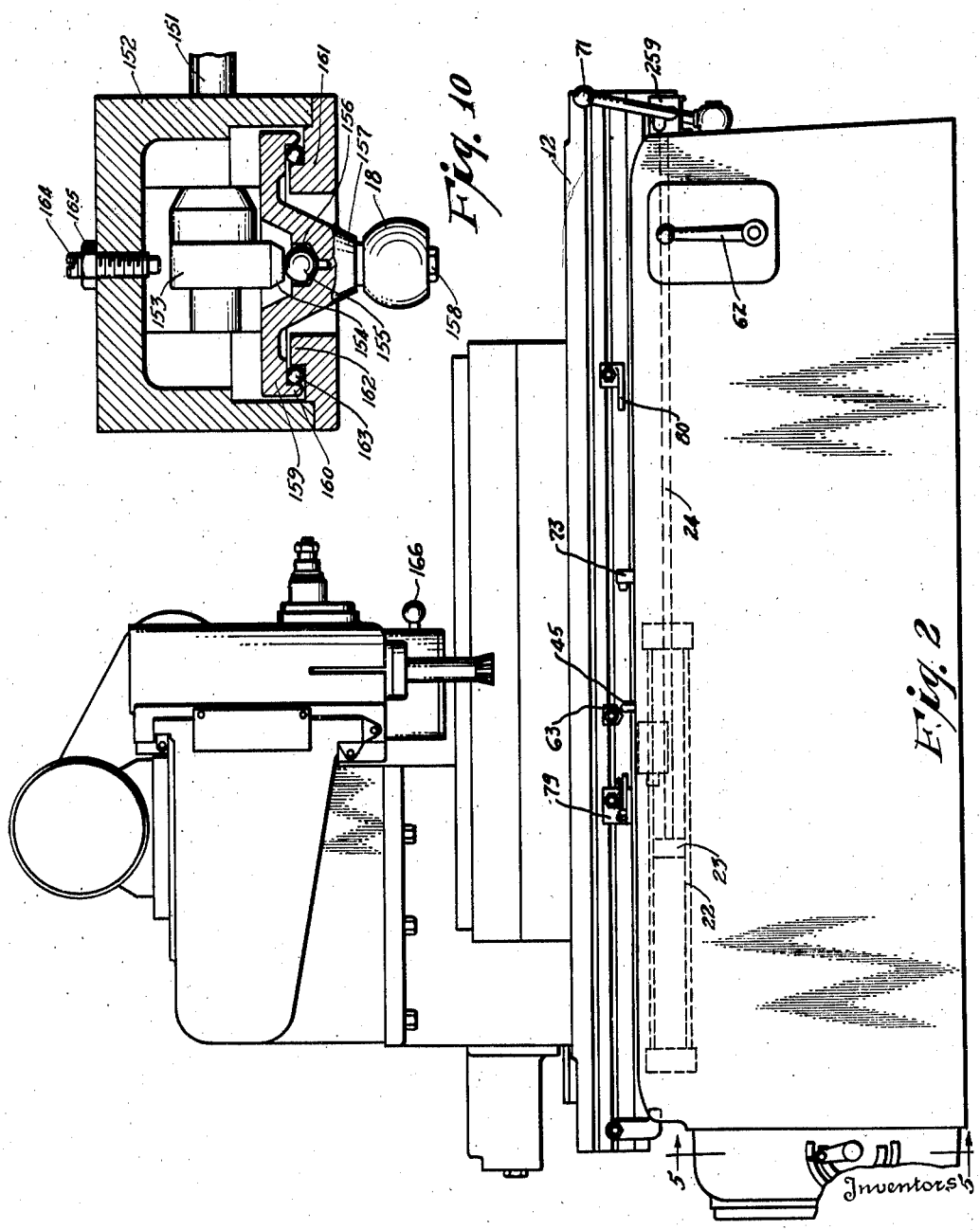

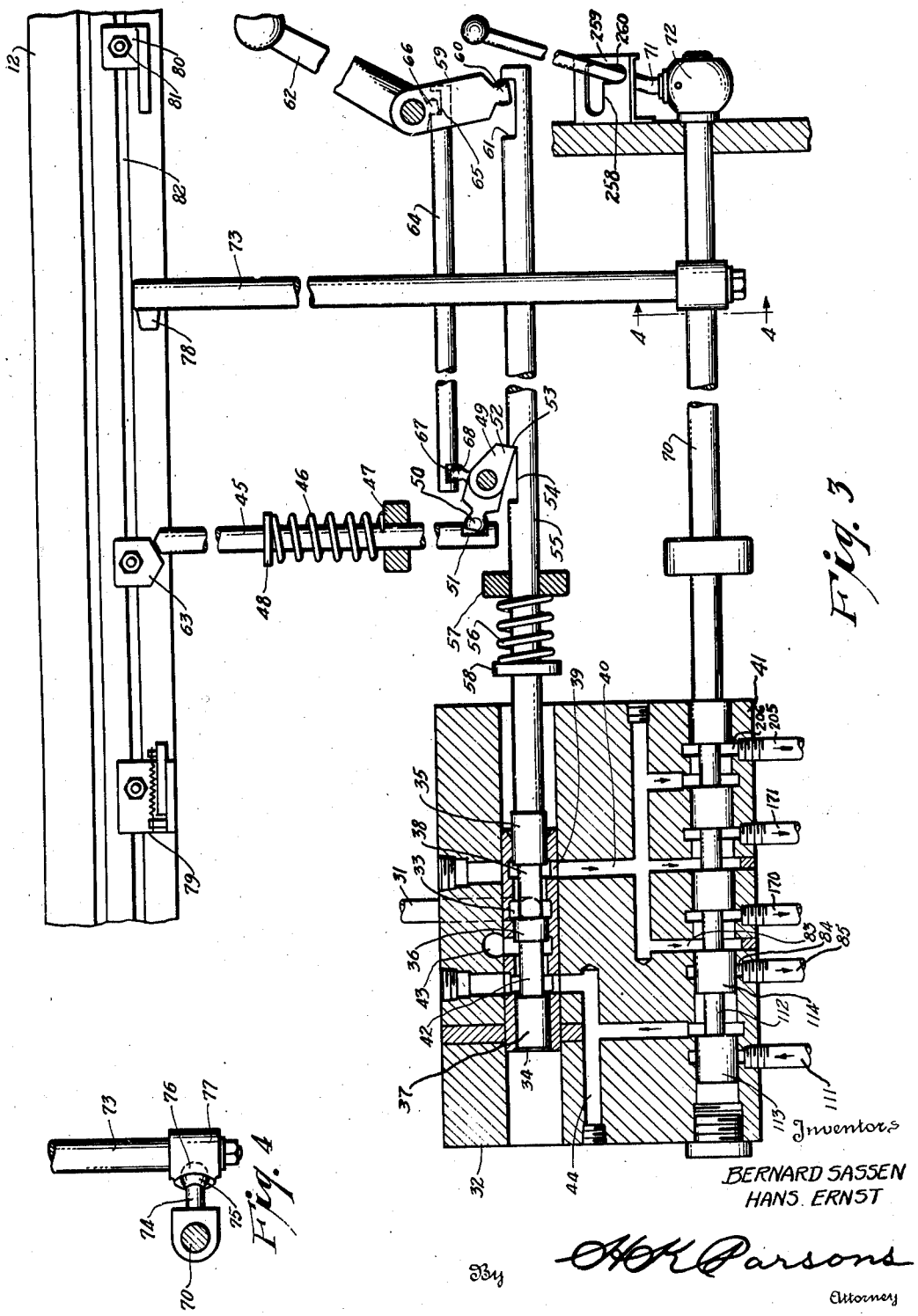

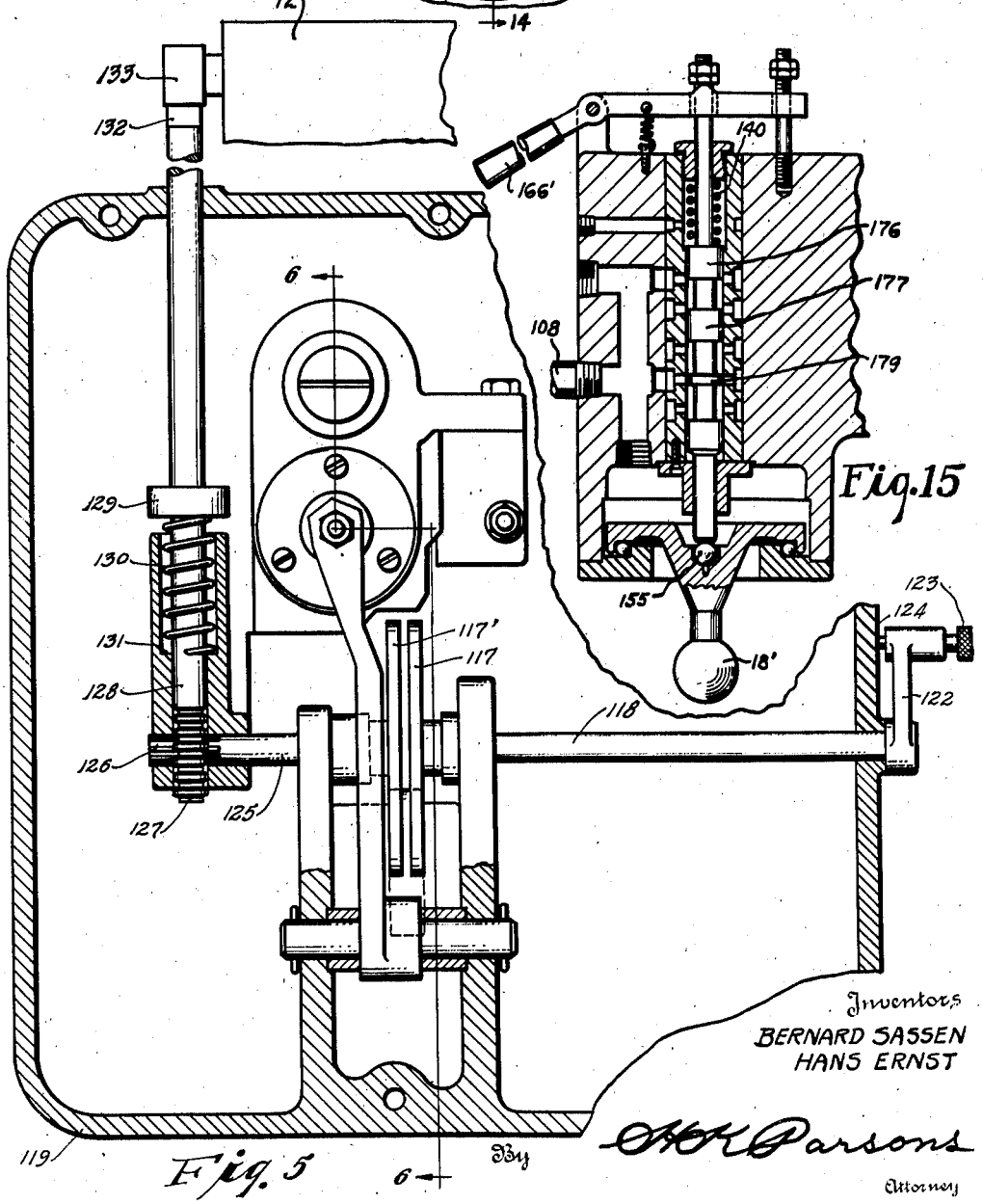

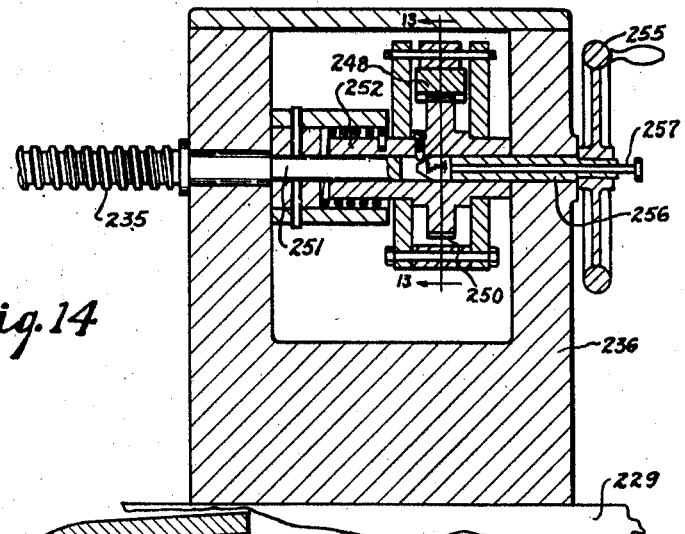
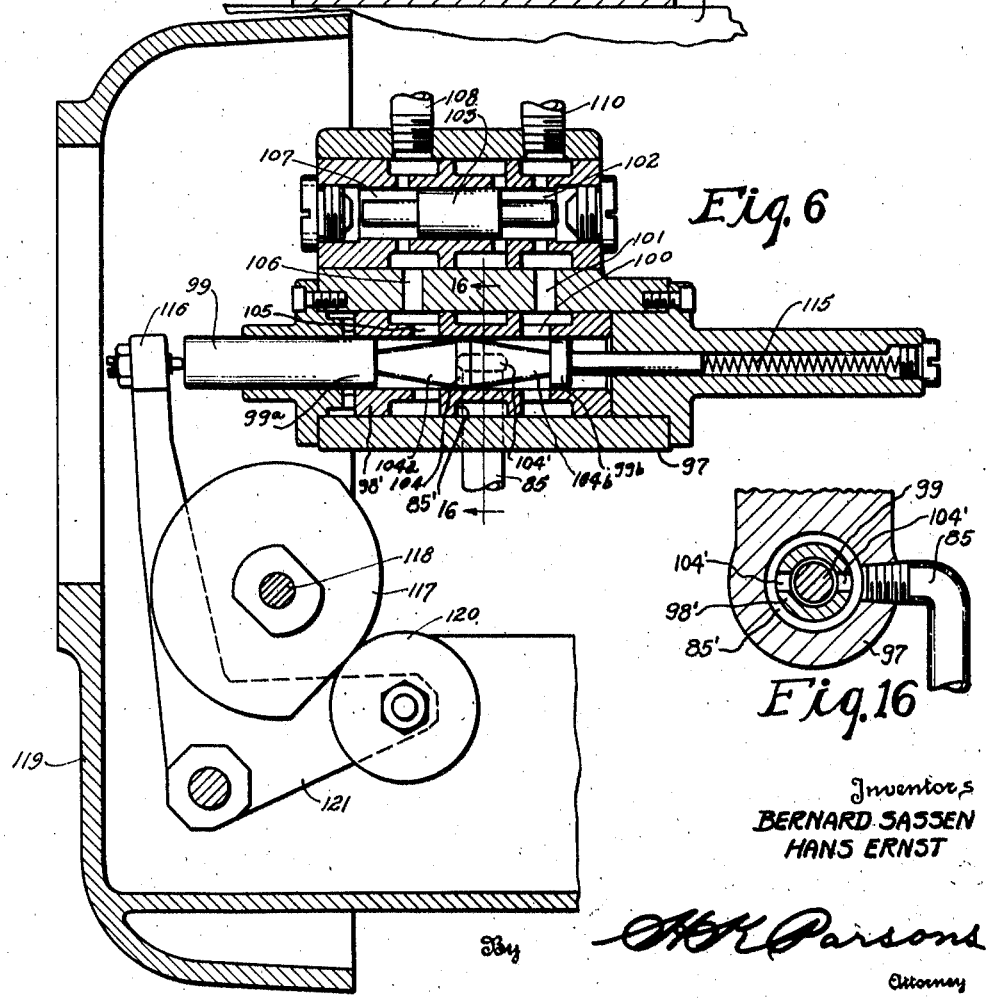

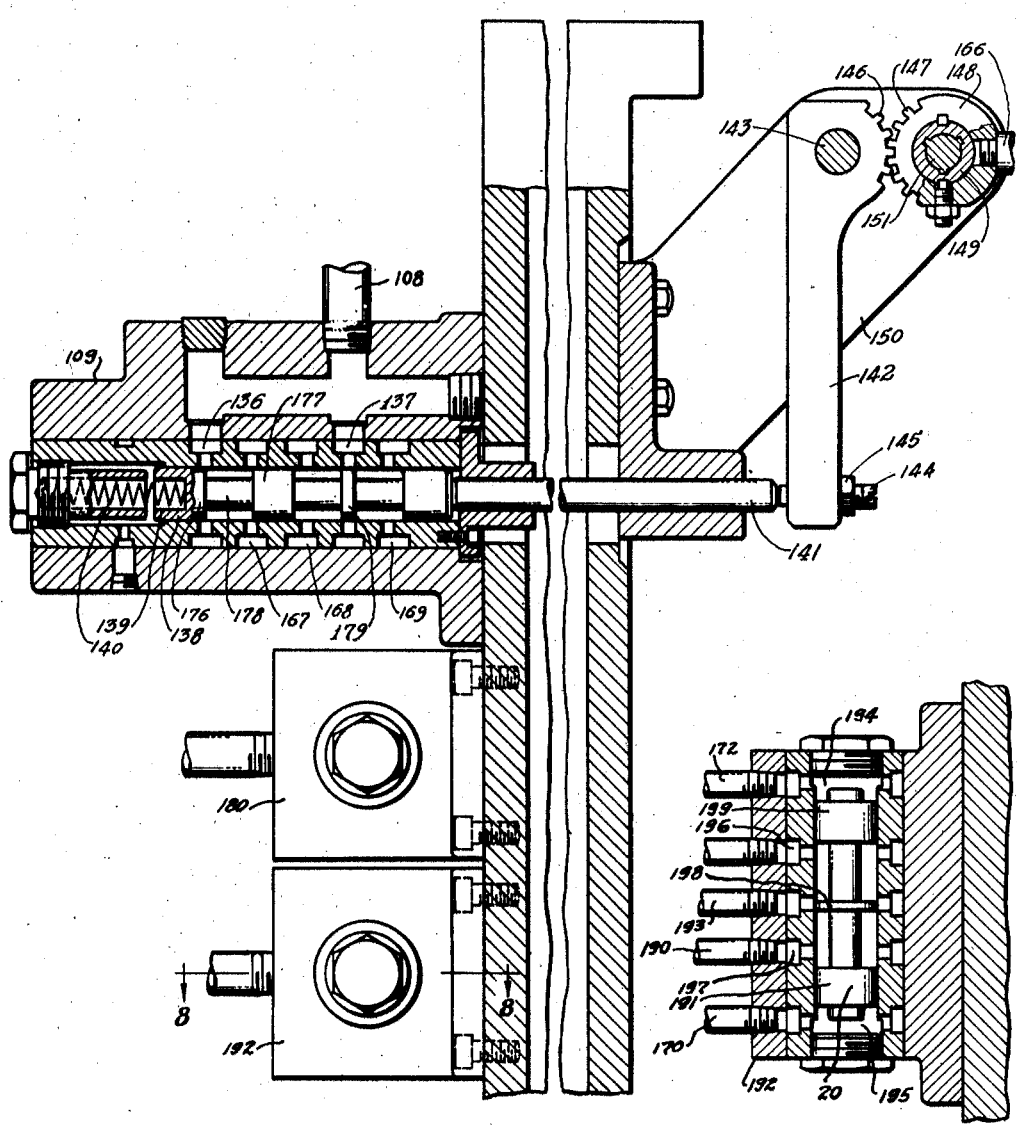

1,978,389

UNITED STATES PATENT OFFICE 1,978,389

AUTOMATIC PATTERN CONTROLLED MILLING MACHINE

Bernard Sassen and Hans Ernst, Cincinnati, Ohio, assignors to The Cincinnati Milling Machine Company, Cincinnati, Ohio, a corporation of Ohio Application September 20, 1932, Serial No. 634,013

28 Claims. (Cl. 90—13.5)

This invention relates to automatic pattern controlled milling machines and more particularly to an improved machine suitable for production purposes. More specifically, this invention aims to incorporate into an automatic profiling machine the automatic cycle principle of plain milling whereby longitudinal work pieces having curvilinear or straight surfaces lying in planes other than the planes of movement of the cutter and work slides may be contoured or profiled with the same facility that work pieces having straight sides or surfaces are now plain milled.

Another object of this invention is to provide a machine that will finish surfaces lying in the same plane but in other than a straight line, or surfaces lying in the same straight line but separated by interfering portions necessitating an undulating cutting path, with the same speed and facility as plain milling operations are now accomplished.

Another object of this invention is to provide an improved milling machine for simultaneously profiling the opposite sides of one work piece, or one side of each of a pair of work pieces to the same or opposite hand in a single pass between tool and work with the same facility as straight milling operations whereby the operator has only to place and remove the work.

A further object of this invention is to provide an improved automatic profiling machine in which the work may be automatically withdrawn at will from the cutter for inspection purposes at any point in the cycle.

A still further object of this invention is to provide improved tracer controlled mechanism for producing opposite handed profiles from a single pattern.

An additional object of this invention is to provide an improved automatic hydraulically actuated pattern controlled die-sinking milling machine.

Other objects and advantages of the present invention should be readily apparent by reference to the following specification considered in conjunction with the accompanying drawings illustrative of one embodiment thereof, and it will be understood that any modifications may be made in the specific structural details hereinafter disclosed within the scope of the appended claims, without departing from or exceeding the spirit of the invention.

Referring to the drawings in which like reference characters indicate like or similar parts:

Figure 1 is an elevation of a machine tool embodying the principles of this invention.

Figure 2 is a side elevation of the machine as viewed from the left side of Figure 1.

Figure 3 is a view partially in section of the manual and automatic control mechanism for one of the movable slides.

Figure 4 is a detail section on the line 4—4 of Figure 3.

Figure 5 is a section on the line 5—5 of Figure 2.

Figure 6 is a sectional view on the line 6—6 of Figure 5.

Figure 7 is a sectional view on the line 7—7 of Figure 1.

Figure 8 is a detail section on the line 8—8 of Figure 7.

Figure 10 is a sectional view through the tracer head.

Figure 11 is a view of the machine when utilized for die-sinking operations.

Figure 12 is a modified form of circuit utilizing a separate rapid traverse pump.

Figure 13 is a section on the line 13—13 of Figure 11.

Figure 14 is a section on the line 14—14 of Figure 13.

Figure 15 is a section on the line 15—15 of Figure 11.

Figure 16 is a section on the line 16—16 of Figure 6.

Figures 17 and 18 are diagrams showing surfaces produced by different cycles of operation.

Figure 9:
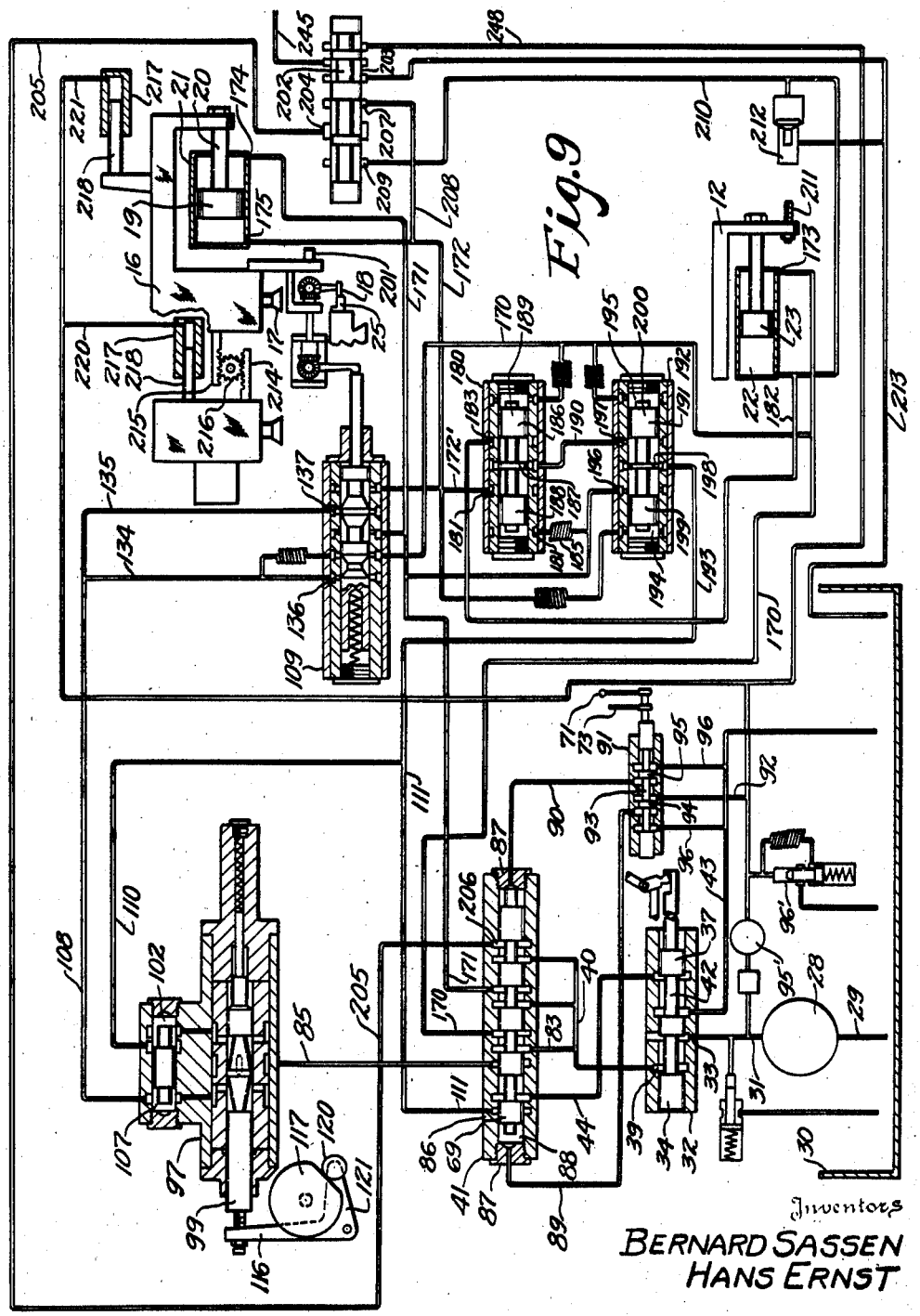
Figure 9 is a diagram of the hydraulic control circuit for the machine.

The machine of the present invention is suitable for profiling and die-sinking purposes, but for simplification of description, its construction and operation as a profiling machine will first be considered. It is well known that machines of this type must be of such form that relative movement between the cutter and tool in three directions may be effected, and this may be arranged for in numerous ways without departing from the principles of this invention. Therefore, only one form is illustrated herein, which may comprise a bed type machine having a movable support thereon for imparting movement in one direction to the work and additional parts for effecting the remaining movements which may be applied to the tracer and cutter.

If the machine is constructed solely for profiling purposes and to suit the requirement of a particular production job, the machine may be somewhat simplified and provided with only two relatively movable slides, the movement in the third direction then amounting to simply an adjustment which may be taken care of by providing a movable quill for the cutter spindle, the pattern and tracer maintaining the same relative positions. In such a case, it is immaterial whether the cutters operate in the same plane as the tracer mechanism or not.

A machine of this simplified form is shown in Figure 1, in which the reference numeral 10 indicates the bed of the machine, having guideways 11 formed on the top thereof for receiving the reciprocating slide 12. A column 13 extends upward from the side of the bed and is provided on the top thereof with an over-hanging rail 14. Horizontal guideways 15 are provided on the rail for receiving a second reciprocating slide 16. In its simplest form the machine may have a single cutter, such as 17, controlled by a single tracer 18. These may be mounted on the same slide, such as 16, the slide being moved back and forth by means of a piston 19 connected to the slide by a piston rod 20, the piston being contained in a cylinder 21 fixed to the rail.

Movement of the slide 12, which may be utilized for supporting the work and pattern, may be effected by means of a cylinder 22 having a contained piston 23 which is operatively connected to the slide by a piston rod 24 as more particularly shown in Figure 2. For profile work the pattern may be in the form of a simple cam, such as 25, which may be detachably connected to a bracket 26 projecting from the side of the table 12 in cooperative relation to the tracer button 18. A work piece, such as 27, may be suitably connected to the table 12 and in proper spaced relation to the pattern so that upon contact between the tracer and pattern the cutter will be moved into operative relation with the work piece.

Hydraulic transmission and control mechanism has been provided under the influence of the tracer button 18 for determining the relative movement between the cutter and work in one direction such as parallel to the guideways 15 and also relative movement in a second direction such as parallel to the work support guideways 11. The hydraulic circuit is diagrammatically illustrated in Figure 9 and comprises broadly a cycle control mechanism 41; a feed rate control mechanism 97; a tracer controlled flow dividing valve and a pair of balancing valves between the flow dividing valve and the slide operating cylinders.

Hydraulic pressure may be supplied to this circuit by a constant displacement pump, which may be of the gear, vane or plunger types. This pump, represented by the reference numeral 28 in Figure 9, has an intake 29 through which fluid is withdrawn from a reservoir 30 located in the lower part of the machine, and a discharge pipe 31 through which the fluid is delivered to a stop valve 32. The pipe or channel 31 is connected to port 33 of the stop valve having a plunger 34 reciprocably mounted therein, as more particularly shown in Figure 3, the plunger having three spools 35, 36 and 37 formed thereon. The reduced portion 38 between spools 35 and 36 serves to connect port 33 with port 39 which in turn is connected by means of channel 40 to the cycle control valve 41. The annular portion 42 between spools 36 and 37 serves to connect the return channel 44 from the cycle control valve 41 to the exhaust port 43. When the stop valve is moved to the left from the position shown in Figure 3, the reduced portion 38 connects the pressure port 33 with the exhaust port 43 which thereby by-passes the pump to reservoir and stops all operation of the machine.

This valve may be automatically controlled for stopping the machine after each reciprocation of the work supporting slide and to that end a reciprocable trip plunger 45 is mounted adjacent the slide 12. This plunger is normally maintained in an elevated position by means of a spring 46 interposed between a fixed part 47 of the bed and a washer 48 integrally attached to the plunger. A pivoted pawl 49 has a ball-shaped end 50 fitting in a socket 51 formed in the side of the plunger 45 near the lower terminus thereof whereby up and down movement of the plunger will cause engagement and disengagement respectively of the pawl portion 52 with the side wall 53 of socket 54 formed in the shifter rod 55. A spring 56 is interposed between a fixed part of the machine 57 and a washer 58 carried by the rod 55 for normally maintaining the plunger 34 to the left and thereby the valve plunger in a by-passing position. Upon movement of the rod 55 to the position shown in Figure 3, as by means of the pivoted crank 59 having the ball-shaped end 60 loosely fitting a socket 61 formed in the rod 55 and operated by the manual control lever 62 mounted on the side of the machine, the pawl 52 will drop into the socket 54 and hold the valve in an operating position against the compression of spring 56. Downward movement of the pawl 52 permits the spring 46 to effect elevation of the plunger 45 to a position suitable for engagement by a trip dog 63 carried by the table 12.

The machine may be stopped at will during its cycle by manually rotating the lever 62 in a clockwise direction which will effect reciprocation of the connecting rod 64, which has a socket 65 in one end for receiving the ball-shaped lug 66 integral with lever 62, and a socket 67 in the other end in which is received the ball-shaped lug 68 of pawl lever 49, and thus withdraw the pawl 52 and permit the spring 56 to come into action to shift the plunger as previously explained. It will now be obvious that the stop valve may be automatically or manually controlled to determine starting or stopping of the machine.

In the preferred method of operation of this machine, the work is traversed relative to the cutter in one direction and in contact therewith at a feed rate after which the cutter and work are separated and the work carrying slide returned to a loading position at a rapid traverse rate. In order to effect these movements automatically, a cycle control valve or reversing valve such as 41 is utilized which may also be manually controlled. As shown in Figure 3 the cycle control valve is provided with a plunger 69 having an operating rod 70 forming an extension thereof. This rod projects through the end of the machine for actuation by a manual control lever 71 which is operatively connected to the rod through a known universal joint structure 72. An oscillatable and rotatable trip plunger 73 is journaled in the bed of the machine for effecting automatic shifting of the valve plunger 69 and is operatively connected to its shifter rod 70 through mechanism shown in Figure 4. The rod 70 has integrally connected therewith the lever arm 74 having the ball shaped end 75 fitting a socket 76 formed in a collar 77 secured to the trip plunger. The upper end of the trip plunger is provided with a wing portion 78 for cooperation with dogs 79 and 80 secured to the side of the table of T-bolts 81 mounted in T-slot 82 formed in the side of the table. One or both of these dogs may be used depending upon the cycle to be performed by the machine.

If so desired, the valve plunger 69 may be reciprocated by auxiliary power means in which case the opposite ends of the valve housing 86 are closed by cylinder heads 87 as shown in Figure 9 forming chambers 88 to which pressure may be admitted through channels 89 and 90 to effect shifting of the valve. The selective admission of pressure to these channels is determined by a pilot control valve 91 having plunger 91' which is operatively connected to the shifter rod 70 and trip plunger 73 in the same manner and by the same construction as that shown in Figure 3. Pressure may be supplied to the pilot valve from pump 95' through channel 92, and the valve may be of the simple well-known reversing valve form having a reduced annular portion 93 formed between the two spools 94 and 95 for alternately coupling the pressure line 92 with either channels 89 or 90. Return channels 96 may also be connected to the valve for alternate coupling with channels 89 or 90. The auxiliary pump 95' may be supercharged by pump 28, and provided with a relief valve 96' to by-pass excess fluid to reservoir.

When the valve 69 is to the left of the position shown in Figure 3, it is in a feed position at which time fluid pressure flows from channel 83 to channel 85 and thence to the rate control valve indicated generally by the reference numeral 97 in Figures 6 and 9 and to which reference may now be had.

As shown in Figure 6, the plunger 99 has a center cylindrical spool portion 104 from opposite ends of which extend taper portions 104a and 104b which terminate in spool portions 99a and 99b respectively. The pipe 85 is in constant communication with an annular groove 85' formed in the periphery of the valve sleeve 98'. A pair of diametrically opposite elongated ports 104' are formed in the bottom of the annular groove 85' communicating with the interior of the sleeve. The length of these ports is equal to the width of the spool plus the length of the stroke of the plunger, so that when the spool 104 is at one end of its stroke as to the left, the port 104' will be connected to port 100 and when at the other end, the port 104' will be connected to port 105. Any intermediate position of the spool will cause a division of flow between the two ports. The port 100 is connected by channel 101 to chamber 102 of the balancing valve 103 and port 105 is connected by channel 106 to the opposite chamber 107 of the balancing valve. This latter chamber is connected by pipe 108 to the flow dividing valve indicated generally by the reference numeral 109; and chamber 102 is connected by channel 110 to the return line 111.

When the cycle control valve plunger 69 is in a left hand position coupling pressure line 83 with channel 85 it also is in a position to connect the return line 111 to reservoir by means of the annular groove 112 formed therein between spools 113 and 114. Spring 115 is mounted in the end of the rate control valve housing for maintaining the plunger 99 in contact with the bell crank lever 116, and also in a normal position in which the port 85 would be completely connected with the return line 110 thereby shutting off all flow to channel 108 leading to the flow dividing valve. The amount of fluid flowing through this line determines the rate at which the cutter and work slides move, and the proportion is determined by the axial position of the plunger 99.

The axial position of the plunger is determined by a cam 117 rotatably mounted on a horizontal shaft 118 journaled in a bracket 119 mounted on the rear of the machine. The periphery of this cam engages a roller 120 mounted in the end of the arm 121 of the bell crank lever 116. The cam 117, keyed to the end of shaft 118, Figure 5, is manually actuated by means of control lever 122 also keyed to the shaft and having an operating handle 123 axially slidable in the end of the lever for engaging a suitable detent plate 124 carried by the side of the bracket for holding the parts in any adjusted position. From this it will be seen that the rate at which the slides are moved may be manually determined by the operator as for instance before the machine is started.

Mechanism has also been provided for automatically varying this rate during the progress of a cut. In this case a second cam 117' is keyed to the end of a coaxial shaft 125 journaled in the bracket 119 and also engaging the roller 120. The shaft 125 has pinion teeth 126 formed on the periphery of the end thereof for engagement with rack teeth 127 formed on the end of a vertically reciprocable plunger 128. This plunger has a fixed collar 129 and a spring 130 interposed between the collar and a fixed portion 131 of the bracket for normally maintaining the plunger in an elevated position. The upper end of the plunger may be wedge shaped, as shown at 132, for engaging a plate cam 133 secured to the side of the table and making line contact therewith. The control cam 133 may be given a suitable outline to suit the type of work being machined so that on portions where the cutting is light, the work may be speeded up and on the other portions the feed rate may be reduced. It will thus be seen that the rate of movement of the slides, or in other words the rate of relative movement between cutter and work may be manually or automatically determined.

The purpose of the feed rate control valve is to divide or proportion the incoming flow between the channels 108 and 110. This volumetric proportion must be maintained irrespective of the total drop in pressure in the two lines and this may be accomplished by maintaining the same drop in pressure from channel 85 to port 100 as from channel 85 to port 105 irrespective of the volumes flowing to the two branches. This constant drop in pressure between channel 85 and the two branches is obtained by providing a balancing valve 103 in conjunction with valve 99. The theory of operation of this balancing in conjunction with a flow dividing valve is more completely described in application of Hans Ernst, et al, Serial Number 490,154, filed October 21, 1930, and therefore further explanation is not believed necessary. It will thus be apparent that the rate control valve serves to divide the incoming flow which is the total delivery from the pump and divides it into proportionate parts, one portion being utilized to effect movement of the slides and the unused portion being diverted to reservoir.

The portion flowing through the line 108 to effect operation of the slides is divided between two branch lines 134 and 135 which lead respectively to ports 136 and 137 of valve 109. This valve is a flow dividing valve and serves to divide the incoming flow between the "in" and "out" ends of cylinder 21 and the "feed" end of cylinder 22. The position of this valve is controlled by the tracer mechanism shown more particularly in Figures 1, 7 and 10. The plunger 138 of this valve has a recessed end 139 for receiving a spring 140 interposed between the end of the plunger and the end of the valve housing for exerting a normal urge on the plunger toward the right as viewed in Figure 7. The opposite end of the plunger engages the end of a shifter rod 141 which in turn acts upon a crank 142 mounted for free rotation on the supporting pin 143. A set screw 144 is threaded in the end of the crank for adjustably determining the position of the valve in accordance with the position of the tracer and a lock nut 145 serves to lock the adjusting screw in a desired position.

The crank 142 is provided with gear teeth 146 engaging gear teeth 147 on the member 148 which is keyed to an oscillatable sleeve 149. This sleeve is held against longitudinal movement in a pair of supporting brackets 150, Figure 1. Axially movable in this sleeve is a splined shaft 151 which is fixed at the other end in a tracer supporting housing 152, Figure 10 which is fixed to the slide 16 for movement therewith. It will thus be apparent that upon reciprocation of the slide that the shaft 151 will slide relative to the sleeve 149 while still maintaining an operative connection therewith. A crank 153 is fixed to the end of the shaft 151 within the housing 152 having a tapered end 154 adapted to engage a ball 155 set in a recess 156 of the universally movable tracer support 157.

A tracer button 18 is rotatably secured to the lower end of this support as by means of bolt 158. The tracer support 157 has an annular flange 159 formed integral therewith from which depends an annular rib 160. A supporting ring 161 is attached to the lower end of the housing 152 and has an upstanding annular flange 162, between which, and the annular rib 160, are mounted anti-friction members, such as balls 163. By means of this construction it will be seen that any lateral pressure in any direction on the tracer button 18 will effect a tilting of the flange 159 resulting in upward pressure on the end of the crank 153 to cause rotation of the shaft 151. This rotation will be imparted to the member 148 which through the gear teeth 147 and 146 will oscillate the crank arm 142 and cause movement of the valve plunger 138 to the left as viewed in Figure 7. To prevent undue lifting of the member 153 and thereby possible derangement or escape of the anti-friction balls, a set screw 164 is threaded in the top of the housing for limiting the upward movement of the crank 153 and a lock nut 165 provided to maintain the set screw in adjusted position. To facilitate adjustment in set up, the member 148 may be provided with a manual control lever 166 which will serve to oscillate the valve plunger to cause desired power movement of the parts.

The valve 109 is provided with three additional ports 167, 168 and 169 to which channels 170, 171 and 172 are connected, the channel 170 leading directly to the port 173 of cylinder 22 to effect feed of the table; the channel 171 leading direct to the port 174 of cylinder 21 to effect "in" movement of the cutter and tracer; channel 172 leading direct to the port 175 of cylinder 21 to effect "out" movement of the cutter and tracer relative to the work and pattern. During actuation of the pump and while the reversing valve 69 is in a feed position, there will be a continuous flow in channels 134 and 135 which is divided between the cylinders 21 and 22 in the proportion determined by the flow dividing valve which in turn is controlled by the tracer and since the incoming flow is a constant quantity, it will be apparent that the sum of the rates of movement of the two slides will always be a constant.

The plunger 138 is provided with two spools 176 and 177 between which is formed an annular groove 178. It will be noted from Figure 7 that when the valve plunger is in a central position as there shown, the spool 176 will close port 136 half way and the spool 177 will close the port 167 also half way. From this it will be seen that the maximum flow from port 136 to port 167 can only occur when the plunger is in a middle position because movement in either direction will cause additional closing of one of the ports and thereby decrease the flow. An additional spool 179 is provided on the plunger and is of sufficient width that when the plunger is in the middle position noted that it will exactly close the port 137. It will be obvious that the ports 168 and 169 will be open and since these ports are connected to opposite ends of the same cylinder 21, any leakage from port 137 past opposite sides of the spool 179 will be substantially equal so that no creeping movement of the parts will occur.

The spring 140 as previously mentioned urges the plunger towards the right as viewed in Figure 7 and through the mechanism described will exert a downward pressure on the crank 153 to hold the tracer support 157 down to its seat and this acts to limit or determine the extreme right hand position of plunger 139, in which position the spool 179 will be located to the right of that shown in Figure 7 so the flow to port 169 will then be zero thereby diverting all the incoming flow from port 137 to port 168. Also the spool 176 will move to the right and completely close port 136. This will cause all of the flow from channel 108 to pass through port 168 and channel 171 to cylinder 21 to cause infeeding of cutter and tracer.

This "in" movement will continue until the tracer button 18 engages the surface of the pattern such as the cam 25 in the present structure. Continued "in" movement after engagement will cause deflection of the tracer which in turn will effect shifting of the valve plunger 138 toward the left. This "in" movement will continue until the tracer has been deflected sufficiently to move the flow dividing valve to its neutral position which is that shown in Figure 7 at which time all flow will then be stopped to the cutter supporting slide and a maximum flow will be delivered to the table cylinder. Should the profile of the pattern be straight at this time, there will be a maximum feed rate without deviation on the part of the tracer or cutter.

A sharp rise in the profile of the pattern, however, will cause a maximum deflection of the tracer and a movement of the valve 138 to the extreme left, thereby diminishing the flow to port 167 and port 168, and initiating flow to port 169 and channel 172 to cause an outfeed of the cutter slide.

When the valve plunger 138 is in a neutral position any undulation in the contour of the pattern will cause a slight flow to either port 168 or port 169 and it will be apparent that this flow will be considerably smaller in proportion to the flow through port 167. Also the frictional resistance to movement of slide 16 may be greater than the resistance of slide 12 thereby creating uneven unit pressures in the two cylinders. Such a condition would unbalance the proportioning of the incoming flow as established by the flow dividing valve resulting in faulty reproduction of the pattern. For this reason, balancing valves have been provided to maintain the proportions established by the flow dividing valve irrespective of variations in work resistance of the two slides and irrespective of variations in temperature or viscosity of the actuating medium.

To this end a balancing valve 180 is provided for balancing the flow between channel 170 and channel 171 and a second balancing valve 192 to balance the flow between channels 170 and 172. In the present instance the balance is maintained by controlling the return flow from the cylinders rather than by controlling the propulsive flow thereto. Therefore, the channel 172, now a return line because 171 is under pressure, is connected, by a branch line 172′, to the port 181 of balancing valve 180; and the return channel 182 from the table cylinder is connected to port 183. The channels 170 and 171 are connected to opposite ends of the balancing valve to shift the same in accordance with variations in pressure and maintain the drops in pressure in the return lines equal irrespective of volumetric flows therein in accordance with the theory previously mentioned in connection with balancing valve 103. Pipe coil resistances 184 and 185 are utilized for making the actual connections as they act as damping means causing a steadier movement of the balancing balance. The valve plunger 186 has an intermediate spool 187 and end spools 188 and 189 respectively and it will be seen that when the valve is in a center position as shown in Figure 9 that there will be no return flow from either actuating cylinder 21 or 22 but a slight unbalancing of the pressures on opposite ends of the plunger will cause a return flow to exhaust channel 190.

Since the line 172 is at this time of considerable lower pressure than channel 170, the plunger 191 of the second balancing valve 192 will be all the way to the left as explained hereafter, thus connecting channel 190 with channel 193 which, during the feed movement of the table, is connected by channel 111 to reservoir. The first balancing valve 180, therefore, serves to balance the flow between the feed line to cylinder 22 and the infeed line to cylinder 21.

Should the flow dividing valve be moved to such a position that pressure was delivered to channel 172 to effect outfeed of the cutter slide during forward feed of the work slide, it will be obvious that the balance must be established between channel 172 and channel 170. The second balancing valve is utilized for this purpose and the channel 172 as previously mentioned is connected to the end 194 of this valve, while the line 170 is connected to the opposite end 195. Also the line 171, which is now a return line, is connected to port 196 while the return line 182 from cylinder 22 is eventually connected to port 197. This is possible because the pressure in line 170 is now greater than the pressure in line 171 which will thereby cause the plunger 186 of the first balancing valve 180 to shift to the left permitting a free flow from port 183 to channel 190. The second balancing valve likewise has an intermediate spool 198 and end spools 199 and 200 whereby when the valve is in a center position all return flow to channel 193 is terminated, while a slight unbalancing to the pressure in either direction will permit a return flow from the opposite cylinder. In this manner it is possible to maintain a balance between the two operating cylinders in accordance with the proportions established by the flow dividing valve and irrespective of variations in work resistances, viscosity or temperature of the actuating medium.

The feeding stroke will thus continue with the tracer controlling the position of the cutter in accordance with the pattern until the end of the stroke is reached, at which time a trip dog, such as 80, will rotate the trip plunger 73 by engagement with wing 78 thereby moving the cycle control valve plunger 69 to the position shown in Figure 3. Shifting of this valve will disconnect the flow to the rate control valve 97; couple the pressure from channel 40 to both the "in" and "out" ends of the cutter slide cylinder through channels 171 and 205 respectively; and close or seal the return line 111 from reservoir. A number of results follow from these changes, first the cutter slide will start to move outward due to the difference in area on opposite ends of the piston 19, while the work slide will stop moving due to the fact that although pressure has been applied to one end of the piston 23, the opposite end has been closed, thereby locking the fluid therein so that no movement of the piston can take place. From this it will be seen that the reversing of the cycle control valve stops the table feed movement and causes the cutter slide to move outward and thereby move the tracer beyond the range of engagement with any projection on the pattern so that the return movement will be free and unobstructed and insure against breakage of the tracer arm.

The cutter slide movement will continue until a stop member 201 affixed to the cutter slide engages the end of a valve plunger 202 of a withdrawal limiting valve 203. This valve has a pressure port 204 which is connected by channel 205 to a port 206 of the cycle control valve. When the valve plunger 202 is in the position shown in Figure 9, it will couple port 204 to port 207 and channel 208, which in turn is connected to channel 172 thereby supplying pressure to the out end of the cutter slide cylinder 21. As the stop member 201 moves the plunger 202 toward the right of the position shown in Figure 9, port 204 will be disconnected from port 207 and connected through port 209 and channel 210 to the return side of cylinder 22. Due to the piston differential in cylinder 22, the force acting on one side of piston 23 will now be larger than on the other side causing a rapid return of the table slide. This rapid return rate will be greater than the feed rate because the channel 170 leading to port 173 is sealed from reservoir and furthermore is connected by valve 69 to channel 83 which leads into the supply line 40 coming from pump 29. The effect of this connection is to conduct the fluid that is being forced out of one side of the cylinder into the other side so that this volume of fluid is added to the volume delivered by the pump to increase the volumetric displacement occurring in the cylinder per unit of time. The quick traverse return movement of the table will continue until a second stop in 211 carried by the table 12 engages the end of a stop by-pass plunger 212 which when opened will connect the pressure line 210 to the open return line 213 thereby by-passing the flow to the table cylinder and stopping the quick traverse return movement.

It will thus be seen that the relative feed movement between cutter and work is terminated automatically by a properly positioned trip dog, and that reversal of the table movement does not immediately occur but rather the cutter and work, as well as the tracer and pattern, separate from one another during a pause in table movement. When the tracer slide has completed its return movement which should be such a distance that the tracer button is safely out of the path of any projection on the pattern, it initiates the return movement of the work slide and simultaneously stops its own movement. The work slide completes its return movement and stops itself by opening of the by-pass valve 212. The parts have now returned to starting position and the operator may change the work.

For production profiling work the machine may be set up for a one-way cycle of operation and the work changed at the completion of each return stroke of the table. For this method of operation one dog such as 80 would be attached to the side of the table to effect oscillation of the plunger 73 and thereby reversal of the table and a stop dog 63 to automatically stop the movement of the table at the end of its return stroke. Even the stop dog may be eliminated if dependence is placed on the by-pass valve 212 to stop the table.

A simplified machine has thus been produced for profiling purposes having a cycle which may be manually initiated by the operator and comprising first a relative movement of the cutter and tracer into contact with the work and pattern whereby a predetermined deflection of the tracer will initiate a feed movement of the table. During this feed, the tracer and cutter will move laterally thereof to reproduce the pattern, the tracer controlled valve being so constructed, that lateral movement of the tracer slide will cause a deceleration of the work slide, or in other words the sum of the rates of movement of the two slides will always be substantially constant. The feeding movement of the table and lateral movement of the tracer slide will continue until a dog trips the reversing plunger. This will cause a momentary pause in the table while the cutter and tracer withdraw from the work and pattern after which the table will return rapidly to the starting position and stop.

Some work pieces have a profile on both sides, the profile on one side being to the opposite hand of the profile on the other side. Means have been provided in the present machine for finishing such work by the use of one tracer with two cutters. For work of this sort, an additional spindle carrier 213 is reciprocably mounted upon the guideways 15 and interconnected with the carrier or slide 16 by means of rack members 214 and 215 integrally connected with the respective slides, and a fixed pinion 216 interposed between the rack members, so that upon movement of the slide 16 toward the work, the rack and gear mechanism will effect a similar movement of the slide 213 toward the work and similarly a return movement of the slide 16 will effect a return movement of the slide 213. To insure that no back lash exists in this connection and thereby insure proper reproduction of both profiles, back lash eliminating cylinders 217 have been provided in conjunction with each slide, containing pistons 218 integrally connected with the slides. Pressure for these cylinders may be supplied from the auxiliary pump 95' through a channel 219 which supplies branch lines 220 and 221 leading to the respective cylinders. As will be noted from Figure 9 the pressure in these cylinders will act to rotate the pinion 216 in opposite directions at the same time, thereby acting to take the back lash out of the mechanism and insure faithful reproduction of the opposite handed profiles.

The cutter spindle 261 carrying cutter 262 and the spindle 263 carrying cutter 17 may be driven from a common prime mover such as the motor 264 mounted on the fixed rail. A splined shaft 265, fixed against axial movement, may be operatively connected to the prime mover through a suitable drive train indicated generally by the reference numeral 266, for supplying power to the spindles. Bevel gears 267 and 268 mounted in the respective carriers in splined connection with the shaft 265 and intermeshing with the respective gears 269 and 270 serve to maintain the drive connection in all adjusted positions of the carriers. Axial adjustment of the spindles may be obtained through well-known rack and gear quill adjusting mechanism having adjusting knobs 271 and 272 on the respective carriers 16 and 213.

The circuit shown in Figure 9 may be slightly modified as shown in Figure 12 to provide for a rapid return movement of the slide without depending upon piston differentials where a feed in either direction may be desirable with a rapid traverse movement in the opposite direction. To this end a cycle control valve 41' is provided having a port 222 to which the pressure line 40 from the stop valve is connected. Additional ports 223 and 224 are provided in the valve and connected to the return line 44 leading to the stop valve. A separate rapid traverse pump 225 of much greater capacity than pump 28 is utilized for effecting the quick return movement and has an intake channel 226 through which fluid is withdrawn from the reservoir 30 and delivered under pressure to channel 227 and port 228 formed in the valve 41'. The previously described channels 205, 85, 111, 171 and 170 are all connected to this valve but the ports are arranged in a slightly different manner so that when the plunger is in the quick traverse position as shown, the pressure port 228 will be connected to channel 205, and the channels 170 and 171 which are now return channels during the quick traverse movement, are connected to the exhaust ports 223 and 224 so that a free return of the exhausted fluid from cylinders 21 and 22 may be effected thereby permitting the quick traverse movement to take place at a greater rate due to the larger capacity of the rapid traverse pump. It will be noted that in this position of the valve the channels 85 and 111 are closed thereby preventing escape of fluid therefrom during the quick return movement. Upon movement of the valve to the left of the position shown, port 222 of pressure channel 40 will be connected to channel 85 and the return channel 111 will be connected to port 223 and return line 44 thereby establishing the same connections as in the previous diagram. It will also be noted that ports 224 and 228 will be connected together thereby permitting the pump 225 to by-pass to reservoir and obviate over-heating of the pump or fluid.

When the machine is used for die-sinking purposes, provision must be made for automatic movement in three planes or directions and for that reason the machine is provided with a cutter supporting structure such as shown in Figure 11. The column of the machine is provided with a vertical guideway 229 upon which is reciprocably mounted the horizontal rail 230. An elevating screw 231 and operating handle 232 serve to effect vertical adjustment of the rail. The rail is provided with horizontal guideways 233 upon which is reciprocably mounted a second slide 234, this slide being laterally adjustable with respect to the work support 12 by means of a lead screw 235 which passes through a fixed nut in the slide. The opposite end of the lead screw is journaled in a housing 236 in which is mounted indexing mechanism to be described later.

Vertical guideways 237 are formed on the slide 234 for receiving the carrier 238 which in the present construction supports the rotatable cutter spindle 239 adapted to be driven through suitable means by the motor 239', and the tracer mechanism 240, Figure 15, which is similar to that shown in Figure 10. In this case the valve plunger acts directly on the ball 155. Also the tracer 18' is made ball shaped which is more suitable for die-sinking purposes. The handle 166' corresponds to handle 166 for manual operation of the valve. The slide 238 is actuated by a piston 241 reciprocably mounted in a cylinder 242 and operatively connected to the slide through the piston rod 243. The table 12 will be reciprocated in the same manner as before by a piston 23 reciprocably mounted in the cylinder 22. It will thus be seen that if the cylinder 242 is substituted for the cylinder 21 in the diagram shown in Figure 9 that the machine will operate in the same manner as that previously described during a given cutting stroke but in a plane normal or vertical to the table rather than parallel to it.

The present machine is designed to effect die-sinking by the one-way cycle method; that is, the cutting takes place during movement of the table in one direction and the return movement is effected at a rapid traverse rate without cutting. The advantage of this method will be apparent when it is pointed out that in the reciprocating cycle method that is cutting in both directions now utilized in many commercial machines, the finished surface is composed of tool marks which are double the pitch of the feed used as shown in Figure 17. This is due to the fact that the tracer has a slight inclination or lag which is inherent in such mechanisms so that upon movement in one direction this lag will exist on one side of the cutter and in the other direction will be on the opposite side of the cutter resulting in the profile section cut by the movement in one direction being slightly offset with respect to the profile section cut by the movement of the cutter in the opposite direction. This will be better understood when it is pointed out the arcs drawn in full lines represent the surfaces produced by the cutter during movement in one direction and the dotted lines represent the surfaces which the cutter would have produced feeding in the opposite direction. If the pitch of the feed is indicated by the letter P it will be seen that the surface actually produced has corrugations equal to twice the pitch, while Figure 18 representing a surface produced by the one way cycle method shows corrugations equal to the pitch of the feed and is therefore smoother and does not have to have as much material removed from it by hand if a perfectly smooth surface is desired as the surface shown in Figure 17.

In the present construction, since the cutting is only in one direction, whatever lag or deflection there is, will always be in the same direction, and the total reproduced surface may be slightly displaced axially with respect to the pattern, but the undulations in the surface will be faithfully formed relative to the similar parts of the pattern.

In die-sinking operations, it is necessary as previously mentioned, to provide a third movement herein termed an indexing movement, which as viewed in Figure 11 amounts to a slight lateral feed of the cutter and tracer for each reciprocation of the work slide similar to the action in a planer or shaper. This is effected automatically by providing an index operating cylinder 244 as shown in Figure 13 which is connected by a channel 245 to the valve 203 as shown in Figure 9. As there shown, this channel will normally be connected to the return line 213 and therefore a spring 246 is mounted in one end of the cylinder 244 to return the piston 247 after each index movement. An additional channel 248 leading from pump 225, Figure 12, is also connected to the valve 203 so that upon movement of this valve to the right by the stop member 201, the channel 248 will be connected to channel 245 to connect pressure to cylinder 244. This will advance the rack member 248 formed integral with the piston rod 249 of piston 247 and effect rotation of gear 250 mounted on the shaft 251. A unidirectional or free-wheeling clutch 252 is interposed between the member 250 and the shaft 251 so that upon movement of the gear in one direction it will be automatically connected to the shaft 251 to effect rotation of the lead screw 235 and in the opposite direction will move independent of the lead screw. The amount of rotation imparted for each movement of the gear will be determined by the stop screw 253 threaded in the side of the housing 236 and positioned so as to engage the end of the rack member 248. A lock nut 254 may be provided for securing the same in adjusted position. Lateral adjustment of the slide 234 may be effected manually by means of the handle wheel 255 journaled on the end of the auxiliary shaft 256 and operatively connected to the lead screw by the reciprocable locking member 257.

It will be noted from the foregoing that the indexing mechanism will operate during each return stroke of the work table to effect a lateral feed to the cutter and tracer during each return movement of the table.

During a die-sinking operation it is sometimes desirable to have the work brought out beyond the normal range of operation for inspection purposes. Since the reciprocating cycle is being used, control dogs 79 and 80 for plunger 73 will be positioned as shown in Figure 3. In order to quickly withdraw the table from the range of these dogs, a control lever 71 is provided with an additional movement whereby this may be effected. When the cycle control valve is in the feed position the lever 71 will be moved to the left of the position shown in Figure 3. If now the lever is moved to the right through the guide slot 258 in the plate 259 attached to the end of the bed, the cycle control valve plunger will be moved to a rapid traverse position. If after completing this movement through the guide slot 258, the lever 71 is rotated as determined by the guide slot 260 the plunger 73 will be axially lowered by means of the mechanism shown in Figure 4 so that the wing 78 will be withdrawn from the path of movement of the dog 79, and the table will move out to any limit as determined by the stop 211 and valve 212. To resume the cycle after inspection of the work, the operator merely returns the lever 71 to its initial position by rotating it counter-clockwise and then shifting it axially whereupon the table will move forward at a feed rate; the dog 79 being a latch dog, will snap by the plunger 73.

It should now be apparent that an automatic pattern controlled milling machine has been provided having a oneway cycle of operation which is capable of effecting an undulatory cutting path suitable for profiling operations with the same facility as a straight cutting path during movement in one direction and a quick return movement in the opposite direction. It will be noted that the hydraulic circuit is also suitable for use in die-sinking operations. In addition novel control means have been provided for automatically effecting separation of cutter and work as well as tracer and cutter at the end of a cutting stroke and before actual return movement of the table has started. Means have also been provided for manually stopping the machine at any point in its cycle, as well as for effecting automatic withdrawal of the work from the cutter for inspection purposes at any time. Thus a machine of the nature disclosed has been provided which is efficient for the work intended and which has few controls making possible successful operation by inexperienced attendants.

What is claimed is:

1. A pattern controlled machine tool having a tracer and cutter, means to support a pattern and a work piece in operative relation respectively to the tracer and cutter, a pair of hydraulic motors operative for effecting relative movement between cutter and work selectively in a plurality of angularly related directions, a source of pressure, a valve for dividing the flow from said source among said motors, and tracer controlled mechanism including mechanical connecting linkage for positioning the valve to effect said relative movement in a path corresponding to the outline of said pattern.

2. A pattern controlled machine tool having a tracer and cutter, means to support a pattern and a work piece in operative relation respectively to the tracer and cutter, a pair of hydraulic motors jointly operative for effecting relative movement between cutter and work in an undulatory path, a source of pressure, a pair of channels extending to one motor and adapted to receive a propulsive flow to effect reverse operation of said motor, an additional channel extending to the other motor to effect unidirectional operation thereof, a valve for selectively coupling pressure to said channels and mechanical linkage coupling the tracer to said valve to effect directional operation of said motors in accordance with the profile of said pattern.

3. A pattern controlled machine tool having a tracer and cutter, means to support a pattern and a work piece in operative relation respectively to the tracer and cutter, a pair of hydraulic motors jointly operative for effecting relative movement between cutter and work, a source of pressure, a pair of channels extending to one motor and adapted to receive a propulsive flow to effect reverse operation of said motor, an additional channel extending to the other motor to effect unidirectional operation thereof, a valve for coupling pressure to said additional channel and simultaneously to alternate of said pair of channels, mechanical linkage coupling the tracer to said valve for positioning the same in accordance with the pattern, and means to maintain constant pressure drops in the simultaneously connected channels irrespective of quantity of flow therethrough.

4. A pattern controlled milling machine having a tracer and cutter, a slide for supporting the tracer and cutter, a second slide movable transversely of the first slide for supporting a pattern and a work piece, separate hydraulic motors for effecting actuation of each slide, a source of pressure therefor, a flow dividing valve, individual channels connecting the valve to the first named motor, said channels being alternatively subjectible to pressure to effect reverse operation of the motor, an additional channel coupling the valve to the second motor, and a tracer control mechanism including a lever arm operatively connecting the tracer to the flow dividing valve for positioning the valve in accordance with the pattern to effect relative feed between cutter and work in a direction determined thereby.

5. A pattern controlled milling machine having a tracer and cutter, means to support a pattern and a work piece in operative relation to the tracer and cutter respectively, a pair of angularly arranged slides for effecting relative movement between the pairs of elements in different directions, separate hydraulic motors for actuating each slide, a source of pressure, a flow dividing valve, individual channels connecting the valve to one of said motors, an additional channel coupling the valve to the second motor, a tracer control mechanism including a lever arm operatively connecting the tracer to the flow dividing valve for positioning the valve in accordance with the pattern, and balancing valves for maintaining the division of flow between the various channels as determined by the flow dividing valve.

6. A pattern controlled milling machine having a first slide for supporting a cutter and tracer, means to support a work piece and pattern in cooperative relation to the cutter and tracer, a second slide for effecting relative movement between cutter and work, individual hydraulic motors for the slides, a source of pressure, a unitary valve structure for controlling the flow of said motors, linkage coupling the tracer to the valve, said valve having a pair of pressure ports, a second pair of ports connected to opposite ends of the cutter slide motor, an additional port connected to the second slide motor, said valve having portions for connecting one of said pressure ports alternately to the cutter slide motor ports to determine the direction of movement thereof, additional portions for coupling the other pressure port to said additional port, said last named valve portion acting to diminish the flow upon increase in flow to the cutter slide motor.

7. A pattern controlled milling machine having a cutter and tracer, a supporting slide therefor, a second slide movable transversely to the first named slide for supporting a work piece and pattern in cooperative relation to the cutter and tracer respectively, individual slide motors, a source of pressure, a flow dividing valve, a pair of channels extending from the valve to the cutter slide motor, an additional channel extending from the valve to the work slide motor for effecting feed movement thereof, a tracer controlled mechanism for the valve, means normally maintaining the valve in a position to close the feed line and one of said pair of lines, and means operable upon deflection of the tracer to couple the pressure to the feed line and reverse the connections to said pair of channels.

8. A pattern controlled milling machine having a tracer and cutter, means to support the work piece and pattern in cooperative relation thereto, separate hydraulic motors for effecting relative movement between the parts in two directions normal to one another, a source of pressure, a tracer controlled flow dividing valve for determining the quantity of fluid to be delivered to each motor and thereby the proportional slide velocities, channels extending from the flow dividing valve to the separate motors, a common return line, means to couple the low pressure end of said motors automatically to the return line, and means to balance the flow between the respective motor exhaust lines to maintain the division of flow in the high pressure ends of said motors in accordance with the position of the flow dividing valve.

9. A pattern controlled milling machine having a tracer and cutter, means to support the pattern and a work piece in cooperative relation thereto, separate hydraulic motors of the piston and cylinder type for effecting relative movement between the parts in two directions normal to one another, a source of pressure, a tracer controlled flow dividing valve for determining the quantity of fluid to be delivered to each motor and thereby the proportional directional velocities and the direction of resultant movement, channels extending from the flow dividing valve to the separate motors, a common return line, means to couple the low pressure end of said cylinders to the common return line, means to balance the flow between the return lines of the respective motors to maintain the division of flow in the high pressure ends of said cylinders in accordance with the position of the flow dividing valve, and means to vary the quantity of fluid delivered to the flow dividing valve to vary thereby the rates of the respective motors.

10. A pattern controlled milling machine having a tracer and cutter, means to support a work piece and pattern in cooperative relation thereto, separate hydraulic motors for effecting relative movement between the parts in two directions normal to one another, a source of pressure, a flow dividing valve, channels extending from the flow dividing valve to one motor to effect relative approach and retraction between cutter and work, an additional channel extending to the second motor to effect a feeding movement, a constant displacement pump, a feed rate control valve coupling the pump to the flow dividing valve, manual means for adjusting said valve to determine the feed rate between cutter and work, and additional means associated with the work supporting slide for automatically varying said rate in accordance with the position of said slide.

11. A pattern controlled machine tool having a first slide for supporting a cutter and tracer, a second slide for supporting a work piece and pattern, an hydraulic motor coupled to the first slide for effecting an in and out movement of the cutter relative to the work, an hydraulic motor coupled to the second slide for traversing the work relative to the cutter, a source of fluid pressure, a tracer controlled flow dividing valve, portions in the valve for connecting the fluid pressure individually or jointly to said motors to effect a pattern controlled feeding movement, and an additional valve interposed between the source of pressure and said flow dividing valve to terminate the flow to the latter valve and effect a rapid return movement of the work slide independent of the tracer controlled mechanism.

12. A pattern controlled machine tool having a first slide for supporting a cutter and tracer, a second slide for supporting a work piece and pattern, an hydraulic motor coupled to the first slide for effecting an in and out movement of the cutter relative to the work, an hydraulic motor coupled to the second slide for traversing the work relative to the cutter, a source of pressure, a tracer controlled flow dividing valve, portions therein for connecting said source individually or jointly to said motors to effect a pattern controlled feeding movement, an additional valve interposed between the source of pressure and said flow dividing valve to terminate flow to the latter and effect a rapid return movement of the work slide indepenednt of the tracer controlled mechanism, said valve having a reciprocable plunger, and trip actuated means associated with the work slide for automatically shifting said plunger.

13. A pattern controlled milling machine having a first slide for supporting a cutter and tracer, a second slide for supporting a work piece and pattern, an hydraulic motor coupled to the first slide for effecting an in and out movement of the cutter relative to the work, an hydraulic motor coupled to the second slide for traversing the work relative to the cutter, a source of pressure, a tracer controlled flow dividing valve, portions therein for connecting said source individually or jointly to said motors to effect a pattern controlled feeding movement, an additional valve interposed between the source of pressure and said flow dividing valve to terminate flow to the latter and effect a rapid return movement of the work slide independent of the tracer controlled mechanism, said additional valve having a reciprocable plunger, trip actuated means associated with the work slide for automatically shifting said plunger, and manual means associated with said plunger to effect rapid return movement of the work at any point during the feed cycle thereof.

14. A pattern controlled milling machine having a first slide for supporting a cutter and tracer, a second slide for supporting a work piece and pattern, an hydraulic motor coupled to the first slide for effecting an in and out movement of the cutter relative to the work, an hydraulic motor coupled to the second slide for traversing the work relative to the cutter, a source of pressure, a tracer controlled flow dividing valve, portions on the valve for connecting said source individually or jointly to said motors to effect a pattern controlled feeding movement, an additional valve interposed between the source of pressure and said flow dividing valve to terminate flow to the latter and effect a rapid return movement of the work slide independent of the tracer controlled mechanism, said valve having a reciprocable plunger, trip actuated means associated with the work slide for automatically shifting said plunger including a pilot circuit for effecting power reciprocation of the control valve plunger.

15. A pattern controlled milling machine having a support, a work slide reciprocably mounted on the support, a cutter slide mounted on the support for movement transversely of the work slide, a tracer carried by one of said slides, a pattern carried by the other slide, a first hydraulic motor coupled to one of said slides for maintaining the tracer in contact with the pattern, an additional motor for effecting relative feed between the work slide and cutter slide, mechanism controled by the tracer for determining the relative position between that cutter and a work piece carried respectively by the cutter slide and the work slide, and control means effective upon completion of a cutting stroke to effect automatic separation of the tracer and cutter from the pattern and work whereby the work slide may be returned at a rapid traverse rate without interference therefrom.

16. A pattern controlled milling machine having a cutter supporting slide and a work supporting slide, a tracer carried by one of said slides, a pattern carried by the other slide, pressure actuated means controlled by the tracer for maintaining the cutter in contact with the work and the tracer in contact with the pattern, additional pressure actuated means controlled by the tracer for effecting a relative feed movement between the cutter and work, a source of fluid pressure, valve means controlled by the work slide for effecting at the completion of the cutting stroke a reversal in the operative effect of said pressure to effect separation between the pattern and tracer, and means carried by the cutter slide upon completion of its return movement to initiate rapid return movement of the work slide.

17. In a pattern controlled milling machine having a cutter slide and a work supporting slide, means to mount the tracer on one of said slides and a pattern on the other slide, individual actuating motors for each slide, a power circuit for controlling operation of said motors including a source of pressure, a cycle control valve and a tracer controlled flow dividing valve in the order named, said cycle control valve having a feed position in which the pump is connected to the flow dividing valve to cause relative feeding movement between the cutter and work in accordance with the pattern, additional channels extending from the cycle control valve to the motors, trip control means effective at the end of the feed stroke to reposition the cycle control valve and couple the pump directly to said motors to effect rapid return movement of the slides, a supplemental valve interposed between the cycle control valve and one of said motors to delay operation of one of said motors until the other slide has completed its return movement.

18. In a tracer controlled profiling machine, individual motors for effecting relative movement between the cutter and a work piece, and pattern and tracer in two directions normal to one another, a source of pressure, a tracer controlled valve mechanism for determining relative movement between the parts during the profiling operation, a cycle control valve for coupling the pressure to said tracer control mechanism, parallel channels extending from the cycle control valve directly to said motors to effect rapid return movement thereof, a first supplemental valve in one of said lines to delay operation of the connected motor until completion of the rapid return movement effected by the other motor, and a second supplemental valve in series with the first named supplemental valve to short circuit the actuating flow thereto and thereby determine the length of its return movement.

19. A pattern controlled milling machine having a pair of motors, means actuated by the motors to effect relative movement between the pattern and tracer and between the cutter and a work piece, a pump, a cycle control valve, a feed line extending therefrom, a tracer controlled valve mechanism for dividing the flow from said feed line among said motors to effect a relative feed movement between cutter and work, manual means to position the cycle control valve to effect delivery from the pump to the feed line, trip actuated means to reposition the cycle control valve to effect rapid traverse operation of said motors independent of the tracer controlled mechanism, a stop valve interposed between the pump and cycle control valve, and trip actuated means for shifting said stop valve at the completion of the rapid return movement.

20. A pattern controlled die-sinking machine including a plurality of slides for effecting relative movement between a cutter and a work piece and between pattern and tracer in two directions in a given plane, individual hydraulic motors for effecting each of said relative movements, a tracer controlled power circuit for determining operation of said motors, said circuit including a trip actuated cycle control valve for effecting relative rapid return movement between the cutter and work in one direction in said plane, mechanical means including a piston and cylinder actuable for imparting an indexing movement at right angles to said plane during the rapid return movement, an individual pump for said cylinder, and a control valve positionable by said slide during its rapid return movement to couple the pump to said cylinder.

21. A pattern controlled milling machine having a pair of slides for effecting relative movement between cutter and a work piece, and pattern and tracer, hydraulic motors for effecting actuation of said slides, a power circuit for effecting relative feed movement including a feed pump, a cycle control valve and a tracer controlled valve operatively connected in the order named for distributing fluid among the motors to effect the feed movement, a rapid traverse pump, parallel channels extending from the cycle control valve directly to said motors, and trip control means for positioning the valve to couple the rapid traverse pump to said parallel lines to effect return movement of the parts.

22. A pattern controlled profiling machine having a reciprocable work support, means to support a pattern on said work support, a pair of cutter slides mounted for relative movement toward and from one another to effect reproduction of a right hand and a left hand copy of the pattern, tracer controlled hydraulically actuated means for positioning one of said cutter slides, mechanical means operatively connecting said slides for simultaneous operation, and an hydraulically actuated back lash eliminating means for said mechanical interconnection.

23. A pattern controlled milling machine having a tracer and cutter, means to support a work piece and pattern in cooperative relation thereto, separate hydraulic motors for effecting relative movement between the parts in two directions normal to one another, a source of pressure, a flow dividing valve controlled by the tracer for distributing fluid to said motors to cause relative movement between the cutter and work in accordance with the pattern, and cam control means for automatically varying the feed rate during relative movement between the cutter and work.

24. A pattern controlled machine tool having a first slide for supporting a cutter and tracer, a second slide for supporting a pattern and a work piece, fluid operable means for maintaining the tracer in contact with the pattern and effecting relative feed movement between the cutter and work, and means automatically operable upon termination of the feed movement to effect separation between the tracer and pattern and a rapid return movement of the work.

25. A pattern controlled milling machine having a support, a work slide reciprocably mounted on the support, a cutter slide mounted on the support for movement transversely of the work slide, a tracer carried by one of said slides, a pattern carried by the other slide a first hydraulic motor coupled to one of said slides for maintaining the tracer in contact with the pattern, an additional motor for effecting relative feed between the work and cutter, and control means selectively effective during the cutter stroke to effect separation of the pattern and tracer and of the cutter and work and successively effect a rapid return movement of the work slide.

26. A pattern controlled milling machine having a bed, a table reciprocably mounted upon the bed, a column uprising at one side of the bed, a horizontal rail projecting from the column over the work table, a slide reciprocably mounted upon said rail, individual pistons and cylinders for traversing the slide and table in directions normal to one another, a source of fluid pressure, a flow dividing valve mounted in the column and connected to said cylinders, a tracer carried by the slide, motion transmitting means coupling the tracer to said flow dividing valve in all positions of the slide for determining the distribution of flow to said cylinders, a pattern carried by the table on the side adjacent the column for controlling said tracer button, a cutter spindle journaled in the slide for operation on work carried by the table, a prime mover mounted on the rail and motion transmitting means coupling the prime mover to the spindle for rotation thereof in all positions of the slide.

27. A pattern controlled milling machine having a cutter and tracer, a supporting slide therefor, a second slide movable transversely of the first named slide for supporting a work piece and a pattern in cooperative relation to the cutter and tracer respectively, individual slide motors, a source of pressure, a tracer controlled flow dividing valve, a pair of channels extending from the valve to the cutter slide motor and alternately subjectable to pressure to cause advance and retraction of the connected slide, and additional channel extending from the valve to the work slide motor for effecting feed movement of the connected slide, means normally maintaining the valve in a position to close said additional channel and connect one of said pair of channels to pressure which will cause advance of the cutter slide, and means operable upon deflection of the tracer to couple the pressure to the feed line and reverse the connections to said pair of channels.

28. In a machine tool of the class described having a tool support and a work support, the combination of individual fluid operable pistons for moving the supports, said pistons having differential areas, a source of fluid pressure, controlled valve means for supplying fluid pressures to the end of one of said pistons to cause relative feeding movement in one directions between the supports, trip operable means for positioning said valve means to cause application of fluid pressure to both sides of one of said pistons to effect separation of the slide, and means responsive to the separating movement to cause application of fluid pressure to the other sides of the said pistons to effect a relative rapid return movement between the supports in a direction opposite to said feeding movement.

BERNARD SASSEN.
HANS ERNST.